United States Patent
Beebe

(10) Patent No.: US 8,085,392 B2
(45) Date of Patent: Dec. 27, 2011

(54) BUBBLE REDUCTION SYSTEM

(75) Inventor: Kevin D. Beebe, Spencerport, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 267 days.

(21) Appl. No.: 12/271,523

(22) Filed: Nov. 14, 2008

(65) Prior Publication Data
US 2009/0135410 A1 May 28, 2009

Related U.S. Application Data

(60) Provisional application No. 60/990,737, filed on Nov. 28, 2007.

(51) Int. Cl.
G01B 9/00 (2006.01)
G08J 7/00 (2006.01)

(52) U.S. Cl. ............... 356/124; 356/124.5; 356/127; 425/445

(58) Field of Classification Search ........... 356/124, 356/5, 125–127, 237.1–237.3; 250/458.1, 250/483.1, 462.1; 264/1.38, 2.5, 2.6; 134/34, 134/21, 32
See application file for complete search history.

(56) References Cited

U.S. PATENT DOCUMENTS

| | | | |
|---|---|---|---|
| 5,578,331 A * | 11/1996 | Martin et al. | 425/445 |
| 5,848,514 A * | 12/1998 | Edwards et al. | 53/53 |
| 5,942,188 A * | 8/1999 | Lepper et al. | 422/62 |
| 6,113,817 A * | 9/2000 | Herbrechtsmeier et al. | 264/1.36 |
| 6,134,342 A | 10/2000 | Doke et al. | |
| 6,267,587 B1 * | 7/2001 | Bishop et al. | 432/121 |
| 6,827,885 B2 * | 12/2004 | Altmann et al. | 264/1.36 |
| 6,852,986 B1 * | 2/2005 | Lee et al. | 250/458.1 |
| 7,139,636 B2 * | 11/2006 | Foreman et al. | 700/198 |
| 7,799,249 B2 * | 9/2010 | Goodenough et al. | 264/1.38 |
| 2004/0074525 A1 * | 4/2004 | Widman et al. | 134/34 |
| 2007/0000387 A1 | 1/2007 | Farber et al. | |

FOREIGN PATENT DOCUMENTS

| | | |
|---|---|---|
| AU | 1451776 | 12/1977 |
| AU | 725874 | 10/2000 |
| EP | 1820550 | 8/2007 |

OTHER PUBLICATIONS

Fred Sense: How can I predict oxygen solubility in water? © 1997-2005 http://antoine.frostburg.edu/chem/senses/101/solutions/faq/predicting-DO.shtml.
Omega Engineering, Inc. Technical Dissolved Oxygen—The Fundamentals © 2006.

* cited by examiner

Primary Examiner — Sang Nguyen
(74) Attorney, Agent, or Firm — John E. Thomas

(57) ABSTRACT

An ophthalmic device forming system includes an inspection station configured to receive a plurality of ophthalmic devices, a fluid supply fluidly connected to the inspection station, the fluid supply containing a working fluid, and a heat source fluidly connected between the fluid supply and the inspection station. The heat source includes a housing, a transfer element, and a low pressure gas region defined by the housing adjacent to the transfer element.

21 Claims, 2 Drawing Sheets

BUBBLE REDUCTION SYSTEM

CROSS-REFERENCE TO RELATED APPLICATIONS

This application claims the benefit of Provisional Patent Application No. 60/990,737 filed Nov. 28, 2007 which is incorporated by reference herein.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

1. Field of the Invention

The present invention relates to equipment used to manufacture ophthalmic devices, and, in particular, to equipment used to manufacture contact lenses.

2. Description of Related Art

Soft hydrogel contact lenses have increased in popularity since they were first introduced in the 1970s. Such contact lenses are conventionally formed through a process in which the material used to make the lenses is placed between two halves of a casting mold, and the entire assembly is then cured to form the desired contact lens shape. After the curing process, the lens is removed from the casting mold and is immersed in a series of fluids to remove impurities therefrom. While still immersed in fluid, the lens is taken to an examination station where it is inspected for foreign particles, holes, and/or deformations caused by the manufacturing process.

Existing systems for the inspection of contact lenses typically include a lens transportation device, a camera, a viewing monitor, and a computer. The computer is configured to run lens examination software which controls the camera during a lens inspection process. In examining the lens, the camera and, in particular, the software, can inspect the lens surfaces for the foreign particles, holes, and deformities discussed above, and the software can control the inspection system to reject a lens if such deformities are found thereon.

Although existing inspection systems have some utility in a contact lens production environment, reliance on such systems can result in a large number of false lens rejections during production. For example, the camera and, in particular, the camera software can not be capable of distinguishing a hole, a foreign particle, or other lens deformities from gas bubbles that have adhered to the surface of the lens. Bubbles can be formed by, for example, turbulent working fluid 42 flow within the various systems used for impurity removal. In such systems, air and other gases can become entrained within the working fluid 42 and high fluid pressures can not allow the entrained air to expand and escape from the working fluid 42. Depending on the type of contact lens being examined and the throughput of the manufacturing line, false lens rejections caused by existing camera inspection systems can dramatically increase production costs and can severely hinder manufacturing efficiency.

Accordingly, the disclosed systems and methods are directed towards overcoming one or more of the problems set forth above.

SUMMARY OF THE INVENTION

In an exemplary embodiment of the present disclosure, an ophthalmic device forming system includes an inspection station configured to receive a plurality of ophthalmic devices, a fluid supply fluidly connected to the inspection station, the fluid supply containing a working fluid, and a heat source fluidly connected between the fluid supply and the inspection station. The heat source includes a housing, a transfer element, and a low pressure gas region defined by the housing adjacent to the transfer element.

In another exemplary embodiment of the present disclosure, a method of degassing a working fluid includes directing a flow of pressurized working fluid across a transfer element of a heat source, releasing entrained gas from the pressurized working fluid, and collecting the released gas in a low pressure gas region adjacent to the transfer element. The method also includes removing the released gas from the low pressure gas region and directing the flow to an ophthalmic device inspection station.

In still another exemplary embodiment of the present disclosure, a method of degassing a working fluid includes directing a flow of pressurized working fluid across a transfer element of a heat source, forming a low pressure gas region adjacent to the transfer element, and removing released gas from the low pressure gas region. The method also includes directing the flow to an ophthalmic device inspection station.

DETAILED DESCRIPTION OF THE DRAWINGS

Figure 1:
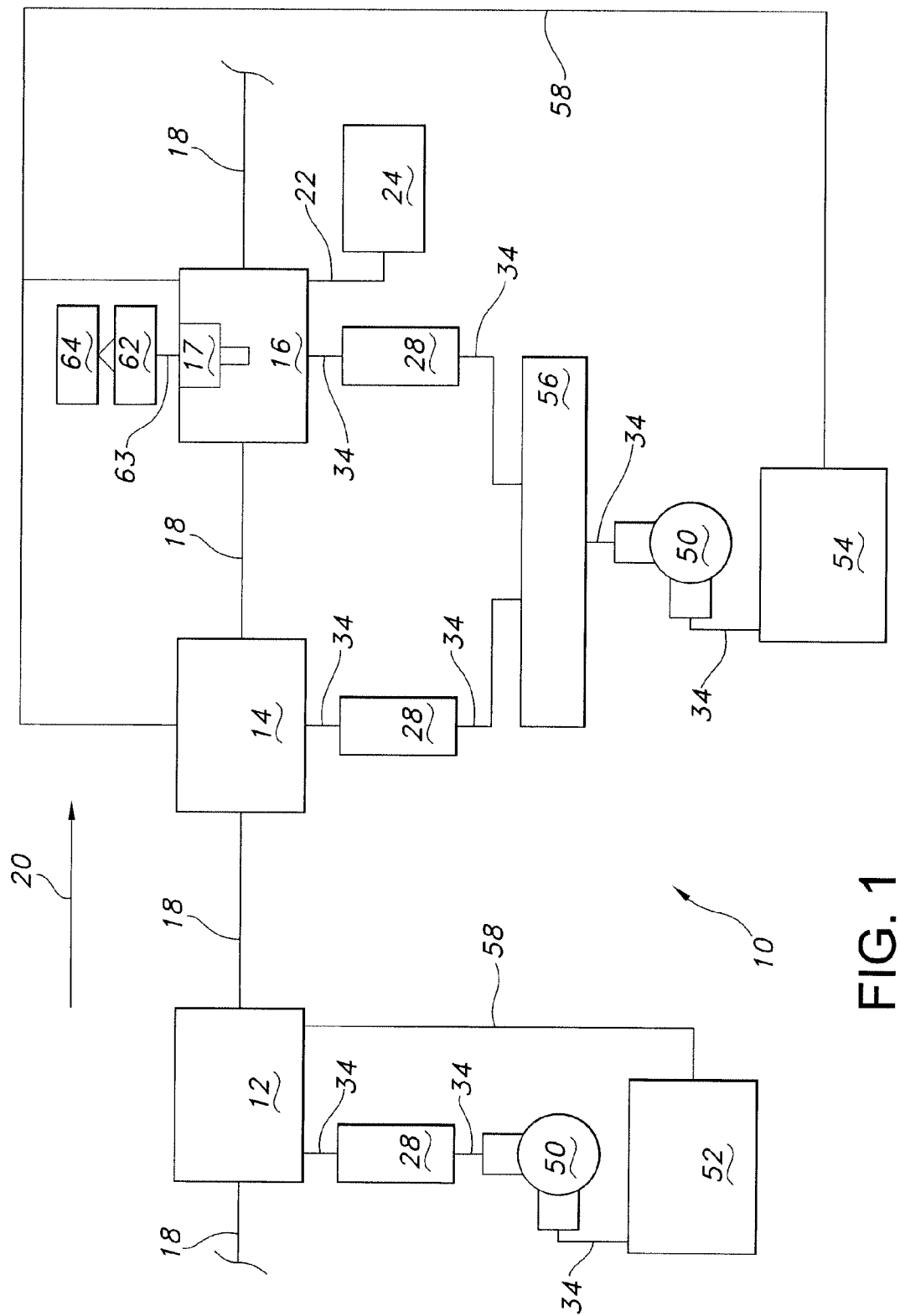
FIG. 1 is a partial diagrammatic illustration of a system for forming an ophthalmic device according to an exemplary embodiment of the present disclosure.

FIG. 1 illustrates an ophthalmic device forming system 10 according to an exemplary embodiment of the present disclosure. As shown in FIG. 1, the system 10 includes, for example, a water bath 12, a cleanser 14, and an inspection station 16. The water bath 12 can be connected to the cleanser 14 via a transport device 18 and the cleanser 14 can be connected to the inspection station 16 by the transport device 18. As shown in FIG. 1, the water bath 12 can be disposed upstream of the cleanser 14 and the cleanser 14 can be disposed upstream of the inspection station 16. The system 10 can also include at least one heat source 28. In an exemplary embodiment, a heat source 28 can be fluidly connected to the water bath 12, the cleanser 14, and/or the inspection station 16, and each of the heat sources 28 can also be fluidly connected to a fluid supply 52, 54.

In forming an ophthalmic device such as, for example, a contact lens, casting molds can be dosed with a monomer, a polymer, and/or other lens forming materials. The entire casting mold assembly can then be placed into a curing apparatus where the ophthalmic device can be formed and/or otherwise cured. Once the lens is formed, a posterior portion of the casting mold can be removed and discarded, and the formed lens can be substantially adhered to the remaining or anterior portion of the casting mold. The lens and the anterior portion of the casting mold can then be placed in, for example, a solvent reduction oven. A plunger mechanism can then be used to apply a pressure to a portion of the anterior portion of the casting mold and a vacuum device can be used to remove the separate lens. The anterior portion of the casting mold can then be discarded and the formed lens can be transported to an edge forming apparatus wherein at least a portion of the substantially circular edges of the lens are rounded. The lens can then be coated with a plasma and/or other lens coating materials, and the coated lens can be transported to one or more machines configured to assist in removing impurities and inspecting the condition of the lens.

In an exemplary embodiment, a coated lens can first be transported to the water bath 12 via the transport device 18. The transport device 18 can be any apparatus and/or collection of machines or devices useful in transporting items having optical quality surfaces from one machine to another machine in an assembly and/or manufacturing environment. The transport device 18 can include one or more gripping devices such as, for example, fingers, hooks, graspers, and/or any other gripping devices known in the art. Such gripping devices (not shown) can be configured to delicately grasp a fragile item such as, for example, a partially formed ophthalmic device and safely transport the fragile item from machine to machine without causing damage thereto. In an exemplary embodiment, the transport device 18 can also include one or more vacuum devices (not shown). The vacuum devices can be configured to handle and/or otherwise grasp the ophthalmic devices while not causing any damage to the one or more optical quality surfaces of the ophthalmic devices during transport. In an additional exemplary embodiment of the present disclosure, the ophthalmic devices formed and/or inspected by the system 10 can be housed in one or more carrying trays, and the carrying trays can be transported from, for example, the water bath 12 to the cleanser 14 and then to the inspection station 16 by the transport device 18. In such an exemplary embodiment, the transport device 18 can be configured to transport the carrying trays between the components of the system 10 without causing any damage to, for example, the carrying trays and/or the ophthalmic devices carried thereby. Alternatively, as discussed above, the transport device 18 can also be configured to transport ophthalmic devices individually between the components of the system 10. In such an alternative exemplary embodiment, the carrying trays can be omitted.

The water bath 12 can be disposed upstream and/or otherwise adjacent to the cleanser 14 and can be configured to receive ophthalmic devices and/or other devices or carrying trays transported by the transport device 18. The water bath 12 can include a housing and/or other components configured to contain fluids such as, for example, water. The housing of the water bath 12 can be made from any metal and/or alloy know in the art such as, for example, FDA approved 316 stainless steel. The water bath 12 can be configured to remove debris, contaminants, and/or other foreign materials from an ophthalmic device such as, for example, a contact lens. Such foreign materials may be adhered to and/or otherwise carried with the ophthalmic device in an ophthalmic device forming process, and the foreign materials can be, for example, dirt, dust, and/or pieces of polymer or monomer material left over from upstream ophthalmic device forming and/or curing processes. The water bath 12 can also be configured to remove, for example, isopropyl alcohol or other cleansing agents supplied to the ophthalmic devices by components of the system 10 disposed upstream of the water bath 12.

The water bath 12 can be fluidly connected to a fluid supply 52 configured to store a volume of working fluid and/or direct a pressurized flow of working fluid to the water bath 12. The working fluid 42 (FIG. 2) can be any fluid known in the art such as, for example, water, isopropyl alcohol, saline solution, and/or any other hydrating and/or cleansing agent. The water bath 12 can also include one or more pressurization devices (not shown) configured to direct the working fluid 42 supplied from the fluid supply 52 towards the ophthalmic devices delivered by the transportation device 18. In an exemplary embodiment, the pressurization devices can include one or more nozzles or other like structures.

The fluid supply 52 can be any drum, container, sump, or other fluid storage device known in the art configured to house and/or otherwise store a large volume of working fluid 42. In an exemplary embodiment, fluid supply 52 can be a fluid supply of the manufacturing facility in which the system 10 is operating. In such an exemplary embodiment, the fluid supply 52 can be a water tower or other like fluid storage device. As shown in FIG. 1, the fluid supply 52 can be fluidly connected to the water bath 12 via one or more supply lines 34. The supply lines 34 can be any tube, pipe, hose, and/or other structure known in the art configured to transmit a pressurized flow of fluid between two components in a production environment. The supply lines 34 can be made from any metal, alloy, plastic, and/or other material useful for transmitting pressurized flows of fluid, and such materials may include, PVC, copper, and FDA approved 316 stainless steel. In an exemplary embodiment, the supply lines 34 can be substantially rigid pipes. Alternatively, the supply lines 34 can be a combination of substantially rigid piping and substantially flexible hoses. The water bath 12 can also be fluidly connected to the supply 52 via a return line 58 configured to direct a flow of working fluid 42 from the water bath 12 to the fluid supply 52. The return line 58 can be mechanically similar to the supply lines 34 described above. In addition, it is understood that the fluid supply lines 34 and the return line 58 can include a number of valves and/or joints to assist in fluidly connecting the water bath 12 to the fluid supply 52.

A pump 50 can be fluidly connected between the fluid supply 52 and the water bath 12. The pump 50 can be configured to draw working fluid 42 from the fluid supply 52 and supply a pressurized flow of the working fluid 42 to the water bath 12 via the supply lines 34. The pump 50 can be any fluid pressurization device known in the art such as, for example, a positive displacement pump or a rotodynamic pump. The pump 50 can also include a power source such as, for example, an electric motor configured to supply rotary power to, for example, an input shaft of the pump 50.

Figure 2:
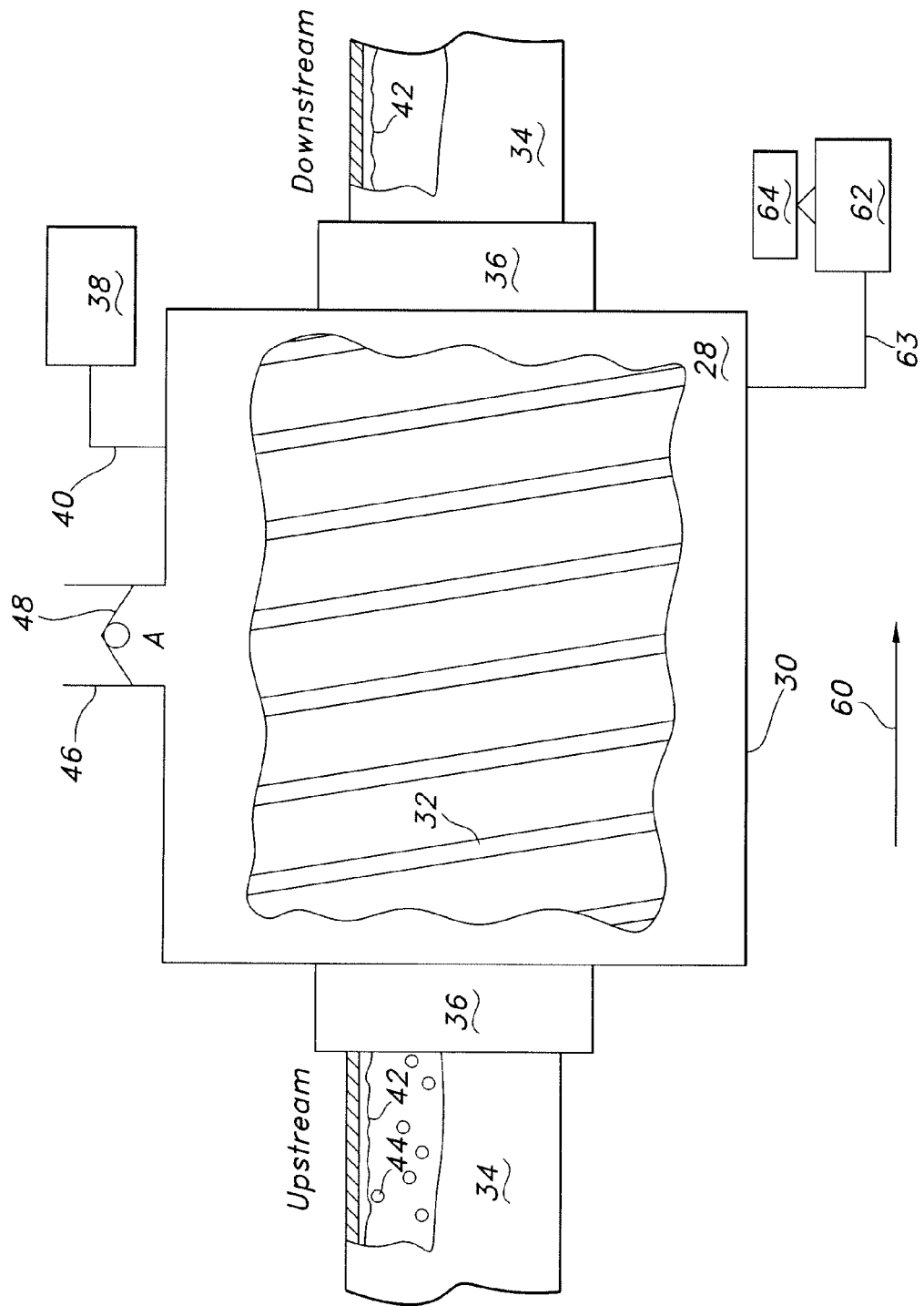
FIG. 2 is a partial diagrammatic illustration of a portion of the system shown in FIG. 1.

As illustrated in FIG. 1, a heat source 28 can be fluidly connected between the fluid supply 52 and the water bath 12, and in an exemplary embodiment, the heat source 28 can be fluidly connected to the water bath 12 upstream of the pump 50. The heat source 28 can be any device known in the art configured to controllably increase the temperature of a pressurized flow of working fluid 42. The heat source 28 may be, for example, an electric heater, a gas heater, a heat exchanger such as, for example, a tube and fin-type heat exchanger, and/or any other type of fluid heater known in the art. As illustrated in FIG. 2, in an exemplary embodiment of the present disclosure, the heat source 28 can include a housing 30 and a transfer element 32 disposed therein. The transfer element 32 can be configured to assist in controllably increasing the temperature of a pressurized flow of working fluid 42.

The heat source 28 can be fluidly connected to, for example, the supply lines 34 via one or more couplings 36. The couplings 36 can be any fluid connection device known in the art such as, for example, band clamps, screw clamps, fluid valves, and/or other like fluid fittings. The couplings 36 can form a fluid-tight connection between, for example, the heat source 28 and the supply lines 34 and, in an exemplary embodiment, the couplings 36 can assist in fluidly connecting the heat source 28 substantially in-line with the fluid supply lines 34.

The housing 30 of the heat source 28 can be any substantially rigid housing configured to house and/or otherwise support a plurality of fluid heating components and to supply a flow of pressurized fluid between two components in a manufacturing environment. In an exemplary embodiment, the housing 30 can be a pipe, hose, or other known structure configured to transmit a pressurized flow of working fluid 42 and, in such an exemplary embodiment, the housing 30 can be mechanically similar to the supply lines 34. The housing 30 can be any shape, size, and/or other configuration known in the art. For example, the housing 30 can be substantially cylindrical and can have a diameter greater than or equal to the diameter of the supply lines 34 connected thereto. In addition, the housing 30 can have any desirable length known in the art, and it is understood that extending a length of the housing 30 can assist in forming a laminar flow of working fluid 42 within the housing 30. Forming such a laminar flow may assist in substantially removing gases entrained within a pressurized flow of working fluid 42.

The transfer element 32 of the heat source 28 can be any component configured to transmit thermal energy to a flow of pressurized working fluid passing adjacent thereto. The transfer element 32 and the housing 30 can be made from any metal and/or alloy known in the art and, in an exemplary embodiment, the transfer element 32 and the housing 30 can be made from the same materials discussed above with respect to the supply lines 34. In an exemplary embodiment, the transfer element 32 and the housing 30 can both be made from the same material and, in such an exemplary embodiment, the transfer element 32 and the housing 30 can be made from FDA approved 3/16 stainless steel. The transfer element 32 can be rigidly connected to the housing 30 by any means known in the art such as, for example, weldments, bolts, brackets, soldering, and/or other devices.

The transfer element 32 can have any configuration known in the art and can include, for example, a coil, a plurality of fins, a plurality of tubes, and/or any other known heat transfer structures. The transfer element 32 can be configured to transfer thermal energy through convection, conduction, and/or any other known heat transfer method. In an exemplary embodiment, a pressurized flow of working fluid 42 can contact the transfer element 32 and the transfer element 32 can conductively add thermal energy to the working fluid 42 as the fluid passes therethrough, thereby desirably increasing the temperature of the working fluid 42. It is understood that the transfer element 32 can be any desirable length so as to assist in transferring a desired amount of thermal energy to the working fluid 42. The transfer element 32 can be electrically connected to a power source 38 via, for example, a power line 40.

The transfer element 32 can also be configured to assist in removing gases entrained within the pressurized flow of working fluid 42. In particular, elevating the temperature of the working fluid 42 can reduce the ability of the working fluid 42 to hold entrained gases such as, for example, dissolved oxygen. Accordingly, bubbles 42 present in the working fluid 42 upstream of the transfer element 32 may be released from the working fluid 42 as the working fluid 42 passes through the heat source 28. Although not shown in FIG. 2, it is understood that the heat source 28 may be fluidly connected to, for example, a vacuum source or other component configured to remove released gases from the heat source 28. Alternatively, the released gases can collect within the housing 30 and can be vented through a port 46 of the heat source 28 to atmosphere or to the manufacturing facility in which the system 10 is operating.

The released gases can include any gases commonly found in the earth's atmosphere such as, for example, oxygen, carbon dioxide, and air. The port 46 can be configured for connection to, for example, a vacuum line and/or the vacuum device discussed above (not shown). In an exemplary embodiment, the port 46 can extend desirably from the housing 30 to facilitate such a connection. The port 46 can be configured to facilitate a substantially fluid-tight connection between, for example, the vacuum line and the housing 30. Regardless of the configuration of the port 46, the housing 30 and/or the port 46 can define a low pressure gas region located upstream, downstream, and/or otherwise adjacent to the transfer element 32. An exemplary low pressure gas region of the present disclosure is illustrated by reference "A" in FIG. 2.

In an alternate exemplary embodiment, the heat source 28 can include a valve 48 fluidly connected to the port 46. The valve 48 can be, for example, a check valve or any other valve known in the art configured to release pressurized fluid. In such an exemplary embodiment, the valve 48 can be normally closed and can be configured to open when pressure within the heat source 28 is greater than a closing pressure exerted by a spring component of the valve 48. Alternatively, the valve 48 can be electrically, pneumatically, manually, and/or otherwise controlled to open and close. In such an embodiment, a position control component of the valve 48 can be controllably connected to a controller 62 of the system 10. As will be discussed in greater detail below, the controller 62 can be any type of controller known in the art configured to assist in manipulating and/or otherwise controlling a group of electrical and/or electro-mechanical devices.

It is understood that the port 46 can have any configuration known in the art and, in an additional exemplary embodiment, the port 46 can be substantially flush with the housing 30. In such an exemplary embodiment, the port 46 can be generally an orifice defined by the housing 30. In such an exemplary embodiment, the low pressure gas region A can be defined by the portion of the housing 30 to which the vacuum line (not shown) and/or the valve 48 is fluidly connected. For example, the low pressure gas region A can be defined by the portion of the housing 30 defining the orifice of the port 46.

Referring again to FIG. 1, the cleanser 14 can be any device known in the art configured to assist in fluidly removing debris, contaminants, and/or other foreign materials from an ophthalmic device such as, for example, a contact lens. The cleanser 14 can be configured to receive ophthalmic devices and/or other devices or carrying trays transported by the transport device 18. The cleanser 14 can be similar in construction to the water bath 12. For example, the cleanser 14 can include a housing and/or other components configured to receive and retain working fluid 42 such as, for example, water, isopropyl alcohol, saline solution, mild soap-like agents, and/or other cleansing agents. The housing of the cleanser 14 can be made from any metal and/or alloy know in the art such as, for example, FDA approved 316 stainless steel.

As discussed above with respect to the water bath 12, the cleanser 14 can be fluidly connected to a fluid supply 54. The fluid supply 54 can be, for example, a tank, a container and/or any other device configured to store and/or retain a supply of fluid such as, for example, water or other working fluids 42. As shown in FIG. 1, a pump 50 can be configured to draw working fluid 42 from the fluid supply 54 and supply a pressurized flow of working fluid 42 to the cleanser 14. In an exemplary embodiment, the pump 50 can be configured to direct a pressurized flow of working fluid 42 to a header 56. The header 56 can be, for example, a manifold or other device useful in delivering a pressurized flow of fluid to a plurality of components. The cleanser 14, header 56, and/or fluid supply 54 can be made from any of the materials discussed above with respect to the supply line 34 and return line 58. In an exemplary embodiment, the cleanser 14, header 56, and/or fluid supply 54 can be made from FDA approved 316 stainless steel or other like metals or alloys. The pump 50 connecting the fluid supply 54 to the header 56 can be substantially similar to the pump 50 connecting the fluid supply 52 to the water bath 12. In an additional exemplary embodiment, the pump 50 fluidly connected to the fluid supply 54 can have a greater pumping capacity than the pump 50 fluidly connected to the fluid supply 52.

As shown in FIG. 1, working fluid 42 from the fluid supply 54 can be directed to the cleanser 14 via supply lines 34 and working fluid 42 exiting the cleanser 14 can be returned to the fluid supply 54 via the return line 58. In an exemplary embodiment, a heat source 28 similar to the heat source 28 described above with respect to the water bath 12, can be fluidly connected to the cleanser 14. A supply line 34 can be configured to direct a pressurized flow of working fluid 42 from the header 56 to the heat source 28, and a supply line 34 can be configured to direct a degassed pressurized flow of working fluid 42 from the heat source 28 to the cleanser 14. Although not shown in FIG. 1, it is understood that a cleaning agent supply and one or more pressurization devices can be fluidly connected to the cleanser such that a cleaning agent can be combined with the pressurized flow of working fluid directed to at least a portion of the cleanser 14. In an exemplary embodiment, the pressurization devices can include one or more nozzles or other like structures.

The heat source 28 can be configured to remove gases entrained within the pressurized flow of working fluid 42 by increasing the temperature of the working fluid 42 to a degassing temperature thereof. Thus, the degassed pressurized flow of working fluid 42 may have a higher temperature than, for example, the temperature of the working fluid stored in the fluid supply 54 and/or the header 56.

The inspection station 16 can be disposed adjacent to the cleanser 14 and cleaned ophthalmic devices and/or other ophthalmic device handling components can be transported from the cleanser 14 to the inspection station 16 by the transport device 18. The inspection station 16 can be any conventional inspection station or apparatus known in the art. The inspection station 16 can include, for example, a housing similar to the housings described above with respect to the water bath 12 and cleanser 14. The inspection station 16 can be configured to receive a pressurized flow of working fluid 42 from the fluid supply 54. As shown in FIG. 1, a supply line 34 can be configured to direct a pressurized flow of the working fluid 42 from the header 56 to the inspection station 16. In an exemplary embodiment, a heat source 28 similar to the heat source 28 described above with respect to the cleanser 14, can be fluidly connected to the inspection station 16 via the supply line 34. In such an exemplary embodiment, the heat source 28 can be configured to remove gases entrained within the pressurized flow of working fluid 42 supplied to the inspection station 16 by increasing the temperature of the working fluid 42 to a degassing temperature thereof. It is understood that, in an exemplary embodiment, the inspection station 16 and/or the cleanser 14 can be connected to dedicated pumps 50. In such an exemplary embodiment, the header 56 can be removed, and the cleanser 14 and/or the inspection station 16 and their corresponding pumps 50 can be connected directly to the fluid supply 54. The degassed pressurized flow of working fluid 42 may have a higher temperature than, for example, the temperature of the working fluid stored in the fluid supply 54 and/or the header 56.

The inspection station 16 can include at least one sensor 17. The sensor 17 can be any diagnostic device such as, for example, a thermocouple, a camera, and/or a pressure sensor. In an exemplary embodiment, the sensor 17 can be a high resolution camera and/or other video, photographic, or image sensing device configured to sense and/or otherwise analyze a surface of an ophthalmic device delivered in proximity thereto. The inspection station 16 can be configured to direct and/or otherwise immerse ophthalmic devices delivered thereto via the transport device 18 in a flow of working fluid 42 supplied by the fluid supply 54. Accordingly, the sensor 17 can be configured to obtain images of the ophthalmic devices in a substantially aqueous environment. It is understood that the transport device 18 can enable the ophthalmic devices transported thereby to be movable relative to the inspection station 16. It is further understood that the sensor 17 can be configured and/or otherwise mounted within the inspection station 16 to be controllably movable relative to the transport device 18 and/or the ophthalmic devices transported thereby. The sensor 17 can be mounted to tracks, motors, belts, robot arms, and/or other devices (not shown) configured to enable relative movement between the sensor 17 and ophthalmic devices delivered to the inspection station 16.

The sensor 17 can be electrically connected to the controller 62 of the system 10. The controller 62 can include, for example, an ECU, a computer, and/or any other electrical control device known in the art. The controller 78 can include one or more operator interfaces 64 such as, for example, a monitor, a keyboard, a mouse, a touch screen, and/or any other devices useful in entering, reading, storing, and/or extracting data from the devices to which the controller 62 is connected. The controller 62 can be configured to exercise one or more control algorithms and/or control the devices to which it is connected based on one or more preset programs. For example, the controller 62 can be configured to control the sensor 17 to obtain images of ophthalmic devices delivered to the inspection station 16 via the transport device 18. The controller 62 can also be configured to operate and/or otherwise execute image software loaded thereon and configured to inspect the images obtained by the sensor for defects in the ophthalmic devices. The controller 62 can also be configured to store and/or collect images and/or other data regarding the ophthalmic devices that are observed. Such data can assist a user in determining the quality and/or usability of the observed ophthalmic device.

The controller 62 can be connected to, for example, the sensor 17 and/or a position control component of the valve 48 (FIG. 2) via one or more connection lines 63. The pumps 50, the motors (not shown) connected to pumps 50, and/or other devices of the system 10 can also be electrically connected to the controller 62 via connection lines 63 (not shown). The connection lines 63 can consist of any conventional electrical connection means known in the art such as, for example, wires or other like connection structures, as well as wireless communication means. Through these electrical connections, the controller 62 can be configured to receive, for example, sensed image data from the sensor 17. In particular, the controller 62 can be configured to receive images of the optical quality surfaces of the ophthalmic devices delivered to the inspection station 16 by the transport device 18. Based on the sensed images, the controller 62 can be configured to control the system 10 to accept the inspected ophthalmic for commercial sale or reject the ophthalmic devices based on one or more detected impurities or lens deformations. The transport device 18 can be configured to direct accepted ophthalmic devices from the inspection station 16 to one or more packaging components of the system 10 configured to package the accepted ophthalmic devices for commercial sale. The inspection station 16 can also be configured to direct the rejected ophthalmic devices to a bin 24 via a transport device 22. The transport device 22 can be substantially similar in configuration to the transport device 18 and the bin 24 can be, for example, a reject bin of the system 10. Ophthalmic devices directed to the bin 24 can be melted down and/or otherwise recycled for use in future ophthalmic device forming processes. Alternatively, the ophthalmic devices directed to bin 24 can be discarded.

INDUSTRIAL APPLICABILITY

The ophthalmic device forming system 10 of the present disclosure can be used with a series of other machines for the inspection and/or formation of ophthalmic devices such as, for example, contact lenses. The system 10 can be configured for use with and/or otherwise included in, for example, an assembly line used to manufacture contact lenses and, in an exemplary embodiment, the system 10 can be used to inspect one or more ophthalmic devices prior to packaging for commercial sale. In particular, one or more heat sources 28 of the present disclosure can be utilized to remove and/or substantially release gases entrained within pressurized flows of working fluid 42 used in the ophthalmic device inspection process. Degassing the working fluids 42 utilized by the system 10 by increasing the temperature thereof can increase the accuracy with which defects are detected by components of the system 10 such as, for example, the sensor 17. Improving the reliability and/or accuracy with which ophthalmic device defects are detected by the sensor 17 and, in particular, reducing the number of false rejects detected by the sensor 17 can be accomplished by degassing, for example, the working fluid 42 supplied by the fluid supply 52 and/or the working fluid 42 supplied by the fluid supply 54.

It is understood that, due to the turbulent flow of the working fluid 42, gases such as, for example, air can become entrained within the working fluid 42 delivered to, for example, the water bath 12, the cleanser 14, and/or the inspection station 16. Once entrained within the working fluid 42 these gases form the bubbles 44 illustrated in FIG. 2. Once the ophthalmic devices are immersed within the working fluid 42, the bubbles 44 carried thereby can adhere to one or more surfaces of the ophthalmic devices and can remain adhered to the ophthalmic devices as the ophthalmic devices are transported to the inspection station 16. Detection of bubbles 44 adhered to the surface of the ophthalmic device by the sensor 17 can result in the indication of a false negative on an otherwise acceptable ophthalmic device. Substantially eliminating the bubbles 44 with the heat source 28, however, can substantially reduce the number of false negatives indicated by the system 10 and can thereby increase the efficiency and overall throughput thereof.

In an exemplary ophthalmic device forming process of the present disclosure, the transport device 18 can deliver one or more ophthalmic devices to the water bath 12. Upon receiving the ophthalmic devices, the pump 50 can be activated to supply a pressurized flow of working fluid 42 from the fluid supply 52, through supply line 34, to the water bath 12. The working fluid 42 can be, for example, water or another lens cleaning agent. The water bath 12 can substantially immerse and/or otherwise wash the ophthalmic devices therein with the pressurized flow of working fluid 42 such that substantially all impurities and/or other foreign objects are removed from the optical quality surfaces of the ophthalmic devices. In addition, the water bath 12 can assist in removing isopropyl alcohol carried by the ophthalmic devices. It is understood that, in an exemplary embodiment, isopropyl alcohol may be deposited on the ophthalmic devices by system components disposed upstream of the water bath 12. A portion of the working fluid 42 supplied to the water bath 12 can return to the fluid supply 52 via the return line 58.

In an exemplary embodiment, a heat source 28 can increase the temperature of the pressurized flow of working fluid 42 supplied to the water bath 12 and thereby substantially remove gases entrained therein. In particular, the transfer element 32 of the heat source 28 can be energized and/or otherwise activated such that it may achieve a desired degassing temperature. As the pressurized flow of working fluid 42 passes over, through, and/or adjacent to the transfer element 32, the transfer element 32 may transfer thermal energy to the working fluid 42 increasing the temperature thereof to approximately the desired degassing temperature. In an exemplary embodiment, the desired degassing temperature may be at least, approximately, 25 degrees Celsius. In an additional exemplary embodiment, the desired degassing temperature may be at least, approximately, 27 degrees Celsius. The transfer element 32 may have any length known in the art to assist in transferring a desired amount of thermal energy to the working fluid 42 and/or to otherwise desirably increase the temperature of the working fluid 42. As the working fluid 42 is heated, gases immersed therein may be released and, as illustrated in FIG. 2, the working fluid 42 downstream of the heat source 28 may be substantially bubble-free.

The entrained gases released through this exemplary heating process can collect within the low pressure gas region A adjacent to the transfer element 32 of the heat source 28. A vacuum device (not shown) can be activated to assist in removing at least a portion of the released gases collected within the low pressure gas region A. Alternatively, the released gases may collect within the low pressure gas region A until the pressure within the low pressure gas region A exceeds a closing pressure exerted by a spring component of the valve 48. The built-up pressure within the low pressure gas region A may force the valve 48 to open, thereby releasing the collected gases from the housing 30. In such an exemplary embodiment, the pressurized flow of working fluid 42 supplied to the water bath 12 can be substantially bubble-free and, in particular, substantially no bubbles may be allowed to adhere to the surfaces of the ophthalmic devices acted on and/or otherwise cleaned by the water bath 12.

As illustrated by arrow 20 in FIG. 1, the ophthalmic devices can then be transferred from the water bath 12 to the cleanser 14 via the transport device 18. It is understood that, as a result of the processes performed by the water bath 12, working fluid 42 utilized in the water bath 12 can be resident on one or more surfaces of the ophthalmic devices transferred to the cleanser 14. Accordingly, the water bath 12 can assist in substantially removing the working fluid 42, supplied by the water bath 12, from the ophthalmic devices. In an exemplary embodiment, the ophthalmic devices can be immersed within a new supply of working fluid 42 directed to the cleanser 14 from the fluid supply 54. As discussed above, the working fluid 42 disposed within the fluid supply 54 can be water, saline solution, and/or any other working fluid 42 that is acceptable and/or non-irritant to the human eye. The pump 50 can direct a pressurized flow of working fluid 42 to the cleanser 14 from the fluid supply 54 and, in an exemplary embodiment, the pump 50 can supply a pressurized flow of the working fluid 42 to the header 56 and the supply lines 34 can direct the pressurized flow to the cleanser 14. As discussed above, components of the cleanser 14 can direct a mild soap-like agent and/or other like lens cleaning agents to the ophthalmic devices. In an exemplary embodiment, the lens cleaning agents can be mixed with the pressurized flow of working fluid 42 directed to the cleanser 14.

In an exemplary embodiment, a heat source 28 can assist in releasing gases entrained within the pressurized flow of working fluid 42 directed to the cleanser 14. As discussed above, the transfer element 32 of the heat source 28 can be energized and/or otherwise activated such that it may achieve a desired degassing temperature. As the pressurized flow of working fluid 42 passes over, through, and/or adjacent to the transfer element 32, the transfer element 32 may transfer thermal energy to the working fluid 42 increasing the temperature thereof to approximately the desired degassing temperature. As the working fluid 42 is heated, gases immersed therein can be released.

A portion of the housing 30 can collect gases released from the pressurized flow of working fluid 42 in, for example, the low pressure gas region A adjacent to the transfer element. The released gases can collect within the low pressure gas region A until the pressure within the low pressure gas region A exceeds a closing pressure exerted by a spring component of the valve 48. Once the pressure within the low pressure gas region A exceeds the pressure applied to the closing member, the valve 48 can open and a portion of the collected gases can be released from the housing 30. In such an exemplary embodiment, the pressurized flow of working fluid 42 supplied to the cleanser 14 can be substantially bubble-free and, in particular, substantially no bubbles may be allowed to adhere to the surfaces of the ophthalmic devices acted on and/or otherwise cleaned by the cleanser 14. Once the pressurized flow of working fluid 42 has been supplied to the cleanser 14, a portion of the working fluid 42 can be returned to the fluid supply 54 via the return line 58.

After the ophthalmic devices have been acted upon by the cleanser 14, the ophthalmic devices can then be transferred to the inspection station 16 by the transport device 18. The ophthalmic devices can again be immersed in working fluid 42 within the inspection station 16 so as not to dehydrate the ophthalmic devices during inspection. As discussed above with respect to the water bath 12 and the cleanser 14, the flow of working fluid 42 directed to the inspection station 16 can be pressurized and, in an exemplary embodiment, a heat source 28 can increase the temperature of the working fluid 42 to a degassing temperature thereof, thereby releasing gases entrained within the pressurized flow of working fluid 42 delivered from the fluid supply 54. In an exemplary embodiment, substantially no bubbles 44 can be entrained within the working fluid 42 downstream of the heat source 28. In such an exemplary embodiment, substantially no bubbles 44 can adhere to the surfaces of the ophthalmic devices being examined in the inspection station 16.

Once immersed in bubble-free working fluid 42 within the inspection station 16, the sensor 17 can obtain one or more images of the ophthalmic devices being examined and can transmit the obtained images to the controller 62 whereby the controller 62 may, through the use of preloaded examination software, determine the status, health, and/or quality of the ophthalmic device being examined. In particular, the software being executed by the controller 62 can determine whether or not the examined ophthalmic device contains any defects. Based on this defect determination, the controller 62 can make the determination whether or not to allow the ophthalmic device to be passed on from the inspection station 16 for packaging and commercial sale or whether to reject the examined ophthalmic device and pass the rejected device to the bin 24 via the transport device 22.

Other embodiments of the disclosed system 10 will be apparent to those skilled in the art from consideration of this specification. It is intended that the specification and examples be considered as exemplary only, with the true scope of the invention being indicated by the following claims.

What is claimed is:

1. An ophthalmic device forming system, comprising:
   an inspection station configured to receive a plurality of ophthahnic devices;
   a fluid supply fluidly connected to the inspection station, the fluid supply containing a working fluid; and
   a heat source fluidly connected between the fluid supply and the inspection station, the heat source comprising a housing, a transfer element, and a low pressure gas region defined by the housing adjacent to the transfer element, wherein the transfer element comprises a heating coil configured to increase a temperature of the working fluid to a desired degassing temperature.

2. The system of claim 1, further comprising a cleanser fluidly connected upstream of the inspection station, and a second heat source fluidly connected between the fluid supply and the cleanser.

3. The system of claim 1, further comprising a water bath fluidly connected upstream of the inspection station, and a second heat source fluidly connected between a second fluid supply and the water bath.

4. The system of claim 1, wherein the transfer element comprises a heating coil configured to remove gas entrained in the working fluid.

5. A method of degassing a working fluid, comprising:
   directing a flow of pressurized working fluid across a transfer element of a heat source, directing the flow across the transfer element comprises increasing the temperature of the flow to a degassing temperature;
   releasing entrained gas from the pressurized working fluid;
   collecting the released gas in a low pressure gas region adjacent to the transfer element;
   removing the released gas from the low pressure gas region; and
   directing the flow to an ophthalmic device inspection station.

6. The method of claim 5, wherein the entrained gas comprises air and the pressurized working fluid comprises water.

7. The assembly of claim 5, wherein directing the flow across the transfer element comprises passing the working fluid adjacent a heating coil.

8. The method of claim 5, wherein directing the flow to the ophthalmic device inspection station includes passing the flow through a supply line, the heat source being coupled in-line with the supply line.

9. The method of claim 5, wherein the low pressure gas region is defined by a housing of the heat source.

10. The method of claim 5, wherein directing the flow across the transfer element comprises substantially removing a plurality of bubbles from the flow.

11. A method of degassing a working fluid, comprising:
    directing a flow of pressurized working fluid across a transfer element of a heat source;
    directing a second flow of pressurized working fluid across a transfer element of a second heat source;
    forming a low pressure gas region adjacent to the transfer element;
    removing released gas from the low pressure gas region; and
    directina the flow to an ophthalmic device inspection station.

12. The method of claim 11, wherein directing the flow across the transfer element comprises releasing entrained air from the working fluid.

13. The method of claim 11, wherein directing the flow across the transfer element comprises passing the working fluid adjacent a heating coil.

14. The method of claim 11, further including inspecting an ophthalmic device with a sensor of the ophthalmic device inspection station.

15. The method of claim 11, further including directing the second flow to a cleanser fluidly connected upstream of the ophthalmic device inspection station.

16. The method of claim 15, further including passing an ophthalmic device from the cleanser to the ophthalmic device inspection station while immersed in a degassed fluid.

17. The method of claim 15, further including forming a low pressure gas region adjacent to the transfer element of the second heat source and removing released gas from the low pressure gas region.

18. The method of claim 15, wherein the first and second flows of pressurized working fluid comprise water.

19. The method of claim 11, further including directing the second flow to a water bath fluidly connected upstream of the ophthalmic device inspection station.

20. The method of claim 19, further comprising passing an ophthalmic device from the water bath to the ophthalmic device inspection station while immersed in a degassed fluid.

21. The method of claim 20, further comprising passing the ophthalmic device from the water bath to a cleanser fluidly connected between the water bath and the ophthalmic device inspection station.

* * * * *